US009213094B2

(12) United States Patent
Golparian et al.

(10) Patent No.: US 9,213,094 B2
(45) Date of Patent: Dec. 15, 2015

(54) IN-FIELD CONFIGURATION OF LAND SURVEY SENSORS

(75) Inventors: Daniel Golparian, Tokyo (JP); John Lepper, Rykkinn (NO)

(73) Assignee: WesternGeco L.L.C., Houston, TX (US)

( * ) Notice: Subject to any disclaimer, the term of this patent is extended or adjusted under 35 U.S.C. 154(b) by 714 days.

(21) Appl. No.: 12/482,584

(22) Filed: Jun. 11, 2009

(65) Prior Publication Data

US 2010/0318298 A1 Dec. 16, 2010

(51) Int. Cl.
*G01C 15/00* (2006.01)
*G01S 5/00* (2006.01)
*G01V 1/00* (2006.01)
*G01S 13/82* (2006.01)

(52) U.S. Cl.
CPC ............. *G01S 13/825* (2013.01); *G01C 15/00* (2013.01); *G01S 5/0027* (2013.01); *G01V 1/003* (2013.01)

(58) Field of Classification Search
CPC ...... G01C 15/00; G01V 1/003; G01S 13/825; G01S 5/0027
USPC ........................................ 702/14; 367/14, 16
See application file for complete search history.

(56) References Cited

U.S. PATENT DOCUMENTS

| 4,897,821 | A | | 1/1990 | Thierry et al. |
| 5,276,655 | A | | 1/1994 | Rialan et al. |
| 5,920,828 | A | * | 7/1999 | Norris et al. ................... 702/14 |
| 6,823,262 | B2 | | 11/2004 | Bahorich et al. |
| 7,117,094 | B2 | | 10/2006 | Fenton |
| 7,292,943 | B2 | * | 11/2007 | Elder et al. ...................... 702/14 |
| 7,725,264 | B2 | * | 5/2010 | Pavel et al. ...................... 702/14 |
| 7,894,301 | B2 | * | 2/2011 | Eperjesi et al. .................. 367/77 |
| 2003/0075380 | A1 | | 4/2003 | Orban et al. |
| 2003/0159877 | A1 | | 8/2003 | Martin et al. |
| 2005/0033519 | A1 | | 2/2005 | Fenton |
| 2005/0047275 | A1 | | 3/2005 | Chamberlain et al. |
| 2005/0114033 | A1 | | 5/2005 | Ray et al. |
| 2005/0236479 | A1 | * | 10/2005 | Schmidtberg et al. ........ 235/384 |
| 2007/0052540 | A1 | * | 3/2007 | Hall et al. .................. 340/572.1 |
| 2007/0188342 | A1 | * | 8/2007 | Valeriano et al. ........ 340/825.49 |
| 2007/0286020 | A1 | * | 12/2007 | Bull et al. ........................ 367/56 |
| 2008/0021658 | A1 | * | 1/2008 | Pavel et al. ...................... 702/14 |
| 2008/0082701 | A1 | * | 4/2008 | Pavel et al. ...................... 710/10 |
| 2008/0159074 | A1 | * | 7/2008 | Guis ............................... 367/40 |
| 2008/0219094 | A1 | | 9/2008 | Barakat |
| 2009/0122645 | A1 | | 5/2009 | Guigne et al. |
| 2009/0218891 | A1 | * | 9/2009 | McCollough, Jr. ........... 307/154 |
| 2010/0286919 | A1 | * | 11/2010 | Lee et al. ......................... 702/16 |
| 2010/0332688 | A1 | | 12/2010 | Pavel et al. |

FOREIGN PATENT DOCUMENTS

| EP | 2105764 A2 | 9/2009 |
| WO | 0116622 A1 | 3/2001 |

OTHER PUBLICATIONS

Motorola RFID Product Brochure, 2007.
PCT Search Report, dated Dec. 30, 2010, Application No. PCT/US2010/038029.

* cited by examiner

*Primary Examiner* — Alexander Satanovsky

(57) ABSTRACT

Described herein are implementations of various technologies for a method for in-field configuration of land survey sensors. One or more planned positions of the sensors may be received. One or more actual positions of the sensors may be determined. The actual positions may be sent to the sensors while the sensors are powered off.

19 Claims, 6 Drawing Sheets

IN-FIELD CONFIGURATION OF LAND SURVEY SENSORS

BACKGROUND

1. Field of the Invention

Implementations of various technologies described herein generally relate to methods and systems for configuring land survey sensors.

2. Description of the Related Art

The following descriptions and examples are not admitted to be prior art by virtue of their inclusion within this section.

Typically, land surveys may be performed for the purpose of geotechnical projects, such as hydrocarbon exploration. Land survey sensors may be deployed in the area to be surveyed based on a plan devised by a geophysicist. The initial plan may simply describe a pattern within which the sensors are to be placed. The pattern usually describes the relationships of sensors to each other in the deployment. These relationships may describe vertical and horizontal distances between individual sensors and/or rows of sensors.

Once the pattern is devised, a survey team may identify coordinates within the survey area where the sensors can be deployed according to the pattern. The survey team may use an actual map of the area to identify potential obstacles in deploying the sensors according to the pattern. Based on the positioning of roads, rivers, private property and the like, the survey team may modify the pattern in order to plan the physical deployment of the sensors.

Once coordinates have been determined for the sensors' deployment, a survey crew may place markers at the coordinates for each sensor. The markers may include flags, pegs, or even colored bags of sand. The crew may then later deploy each sensor at the positions of the markers.

In some circumstances, conditions on the ground may prevent the placement of a sensor at the planned coordinates. For example, some of the markers may have been removed before the sensors are deployed. Further, soil conditions at the planned coordinates may impede sensor deployment. For example, rocky soil at the planned coordinates may make digging impractical. Accordingly, the survey crew may place the sensor at a different location near the planned coordinates.

The data collected by the sensors is later processed at a data center to produce images of the subsurface of the survey area. As such, placing the sensors in locations other than the planned coordinates may introduce errors into the processing and the images produced therefrom.

SUMMARY

Described herein are implementations of various technologies for a method for in-field configuration of land survey sensors. In one implementation, one or more planned positions of the sensors may be received. One or more actual positions of the sensors be determined. The actual positions may be sent to the sensors while the sensors are powered off.

In another implementation, a plurality of sensors may be disposed in a survey area. A handheld device may be used for configuring the sensors. The handheld device may receive one or more planned positions of the sensors. The handheld device may determine one or more actual positions of the sensors. Further, the handheld device may send the actual positions to the sensors while the sensors are powered off.

In another implementation, seismic data may be received from one or more sensors in a survey area. The actual positions of the sensors may be received. The seismic data may be processed based on the actual positions.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraph provides a brief summary of various techniques described herein. In general, a set of coordinates for positioning land survey sensors may be downloaded to a handheld device. A survey crew may place the sensors according to the downloaded coordinates. In some circumstances, the sensors may be placed in positions different than, but near to, the planned positions. After placing the sensor, the survey crew may determine the actual coordinates of the placed sensor by using a global navigation satellite system device. The coordinates may be written to a radio frequency identification (RFID) tag in the sensor. After the survey is conducted, the coordinates may be merged with the acquired survey data for processing. One or more implementations of various techniques for in-field configuration of land survey sensors will now be described in more detail with reference to FIGS. 1-6 in the following paragraphs.

Figure 1:
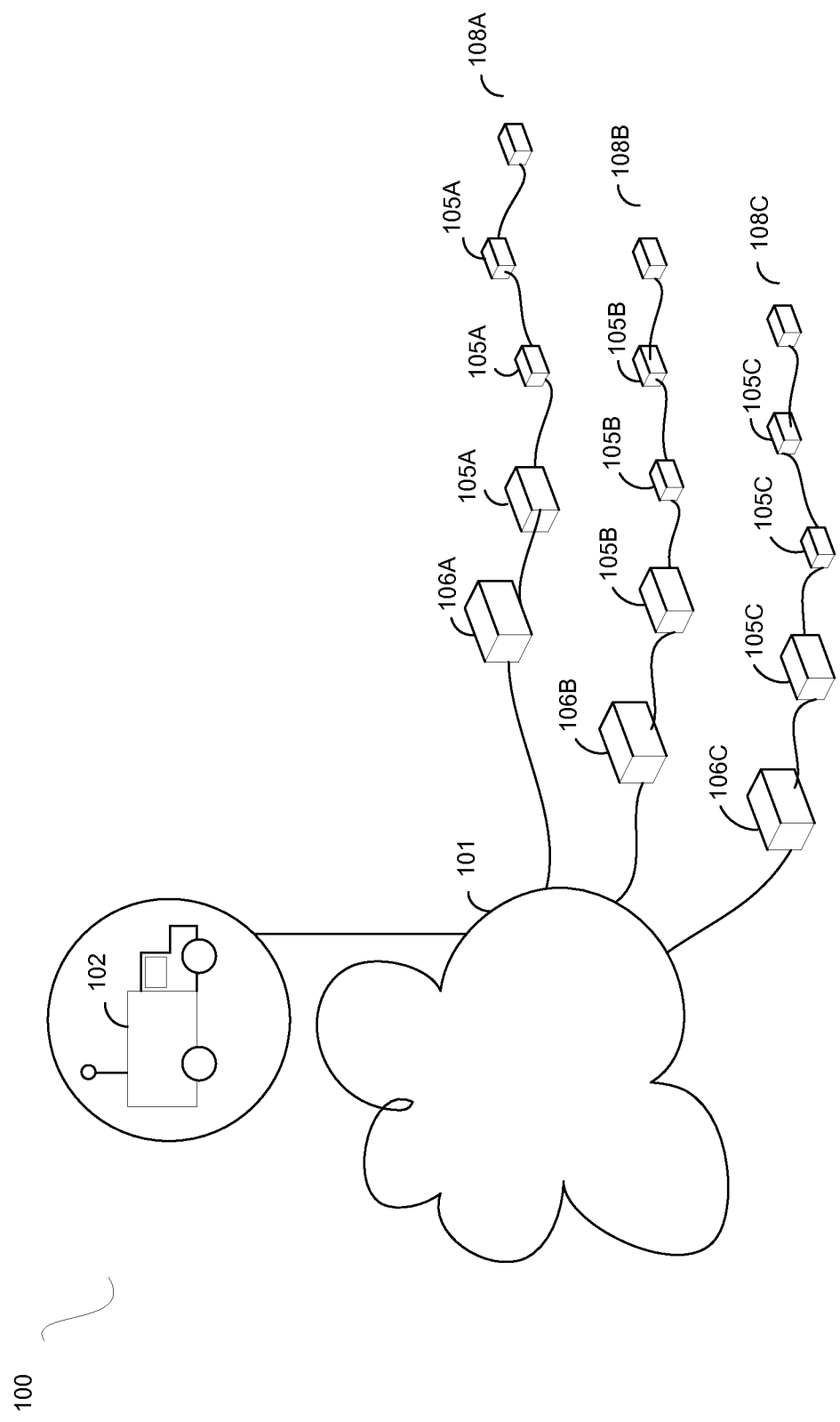
FIG. 1 illustrates a land-based survey data acquisition system in accordance with one or more implementations described herein.

FIG. 1 illustrates a land-based survey data acquisition system 100 in accordance with one or more implementations described herein. The system 100 may include rows 108 of land survey sensors 105, concentrators 106, a network 101, and a recording truck 102. The system 100 may be used to acquire data for an electromagnetic or a seismic survey. As such, the sensors 105 may be electromagnetic or seismic. For the purpose of clarity, the following discussion describes implementations of various techniques for the seismic survey.

The survey data acquisition system 100 may aim to capture information about acoustic and elastic energy that propagates through the subsurface of the survey area. The energy may be generated by one or more seismic sources (not shown). In one implementation, the seismic sources may be vibratory sources (vibrators). The vibrators may produce a pressure signal that propagates through the earth into the various subsurface layers of the survey area. In this manner, elastic waves may be formed through interaction with the geologic structure in the subsurface layers.

Elastic waves may be characterized by a change in local stress in the subsurface layers and a particle displacement, which is essentially in the same plane as the wavefront. Acoustic and elastic waves may also be known as pressure and shear waves. Acoustic and elastic waves may also be collectively referred to as the seismic wavefield.

The structure in the subsurface may be characterized by physical parameters such as density, compressibility and porosity. A change in the value of these parameters is referred to as an acoustic or elastic contrast and may be indicative of a change in subsurface layers, which may contain hydrocarbons. When an acoustic or elastic wave encounters an acoustic or elastic contrast, some part of the waves will be reflected back to the surface and another part of the wave will be transmitted into deeper parts of the subsurface. The elastic waves that reach the land surface may be measured by the sensors 105. The sensors may measure seismic data, such as displacement, velocity, and acceleration. Examples of sensors 105 may include geophones, accelerometers, and the like.

The measurement of elastic waves at the land surface may be used to create a detailed image of the subsurface including a quantitative evaluation of the physical properties such as density, compressibility, porosity, etc. This is achieved by appropriate processing of the seismic data at a data center (not shown).

The recording truck 102 may receive the seismic data from the concentrators 106. Each of the concentrators 106 may route the seismic data from multiple sensors 105 within a row 108 to the recording truck 102 over the network 101. In one implementation, the network 101 may be a wireless network.

Typically, the appropriate processing of the seismic data is based on the coordinates of the actual positions where the sensors 105 are placed. As will be explained later in this document, in one implementation, the coordinates are contained within the sensors 105. The coordinates may also be transferred to the recording truck 102 as described above.

Figure 2:
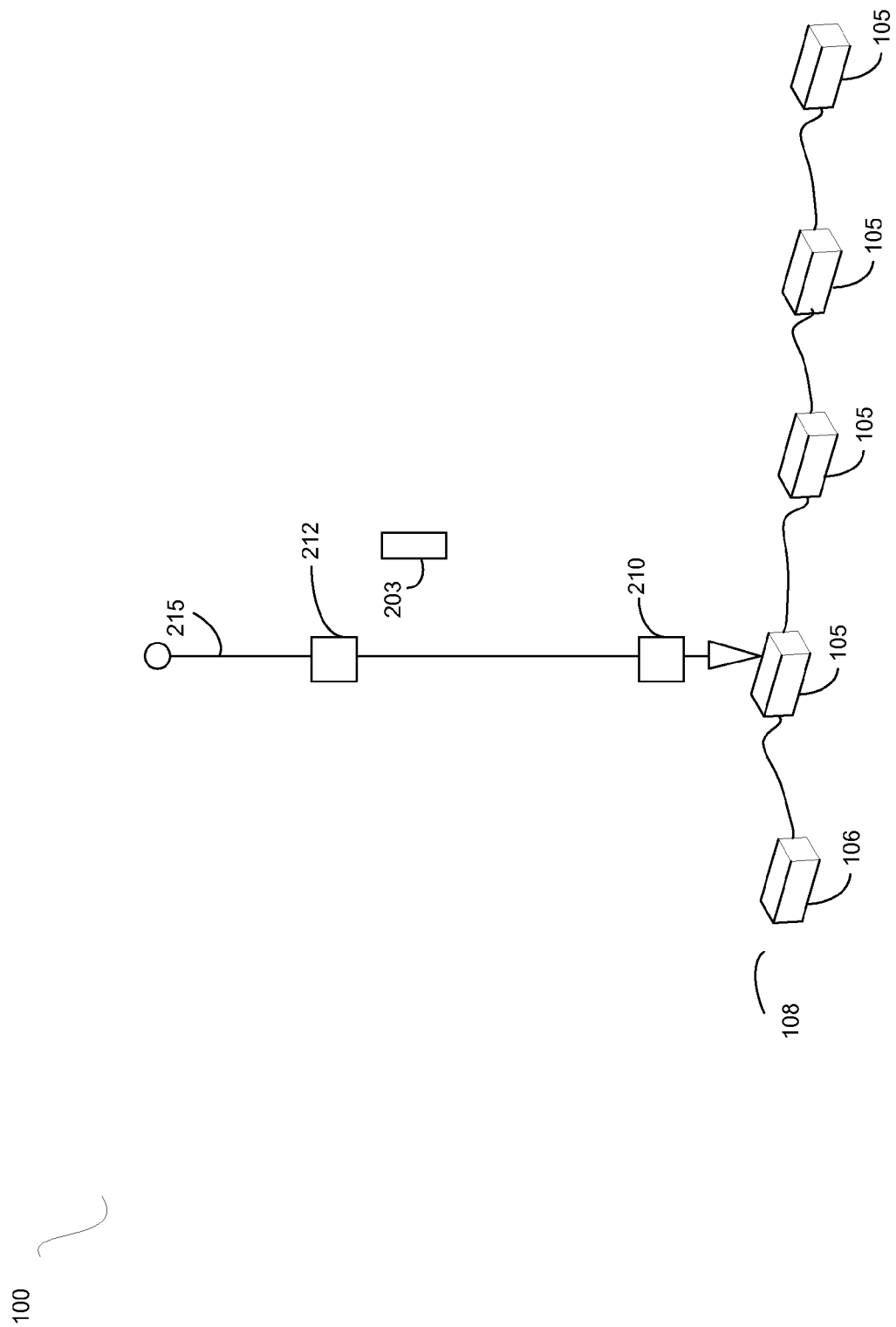
FIG. 2 illustrates a land-based survey data acquisition system in accordance with one or more implementations described herein.

FIG. 2 illustrates a close up view of a portion of the land-based survey data acquisition system 100 in accordance with one or more implementations described herein. As stated previously, the survey crew may place the sensors 105 according to a set of positions planned by the survey team. The planned positions may be downloaded to a handheld device 203. Once placed in position by the survey crew, the coordinates of the actual positions where the sensors 105 are placed may be stored within the sensors 105.

In one implementation, a tool 215 containing a global navigation satellite system (GNSS) device 212 and a read-write device 210 may be positioned on top of the placed sensor 105. The tool 215 may then be used in conjunction with the handheld device 203 to determine the coordinates of the actual positions, and send the actual positions to the sensor 105 for storage.

GNSS may refer to a space-based navigation system, such as the global positioning system (GPS). Implementations of the various techniques described herein may include GNSS's such as Glonass, Galileo, Compass, or combinations thereof.

The read-write device 210 may be used to send the actual position of the sensor 105 upon which the tool 215 is placed to the sensor 105. Further, the read-write device 210 may be used to receive a serial number of the sensor 105. The serial number may be used for later processing in determining whether seismic data from all the sensors 105 is being processed. In one implementation, the read-write device 210 may be a radio frequency identification (RFID) reader and writer.

RFID is an automatic identification method, relying on storing and remotely retrieving data using devices called RFID tags or transponders. RFID is a two-part system including interrogators and tags. The interrogators are also referred to herein as readers. The readers may be devices that communicate with tags to receive information from the tag.

Tags may be passive, semi-passive, or active. In the case of a passive or semi-passive tag, the reader may also provide power to the tag. Passive tags require no internal power source. However, semi-passive and active tags may require a power source, usually a small battery. The active RFID tags may include a RFID transceiver, which broadcasts signals to the reader, and a non-volatile memory. Further, the active RFID tags may have their own internal power source that may be used to power integrated circuits and to broadcast signals to the reader.

Semi-passive tags are similar to active tags as they have their own power source, but the battery is used just to power the microchip and not broadcast a signal. The radio frequency (RF) energy may be reflected back to the reader like a passive tag. A reader may emit radio waves in ranges from about one inch to over 30 meters, depending upon its power output and the RF used. When a passive tag passes through an electromagnetic zone of the reader, the passive tag may detect the reader's signal. The reader may decode the tag's data and typically, the data may be passed to a host computer for processing.

The GNSS device 212, read-write device 210 and the handheld device 203 are described in greater detail with reference to FIGS. 3-4.

Figure 3:
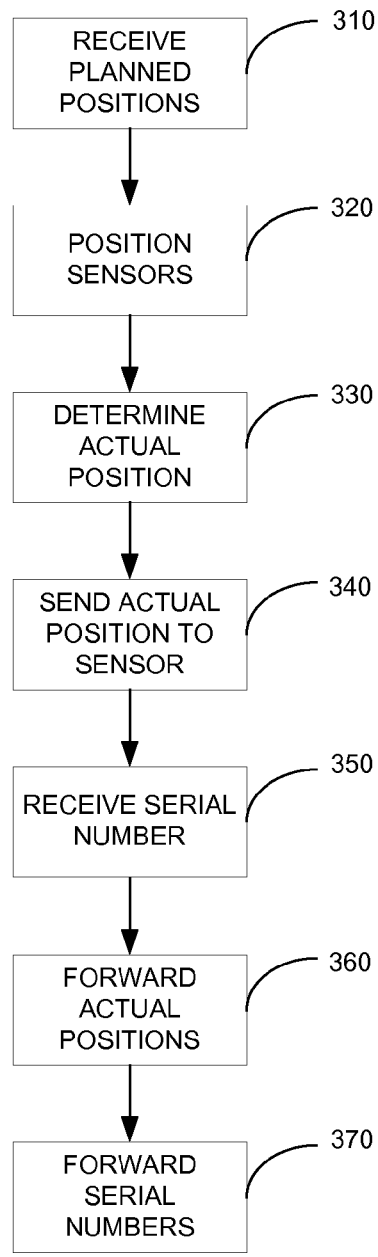
FIG. 3 illustrates a flow chart of a method for configuring land survey sensors in accordance with one or more implementations described herein.
Figure 4:
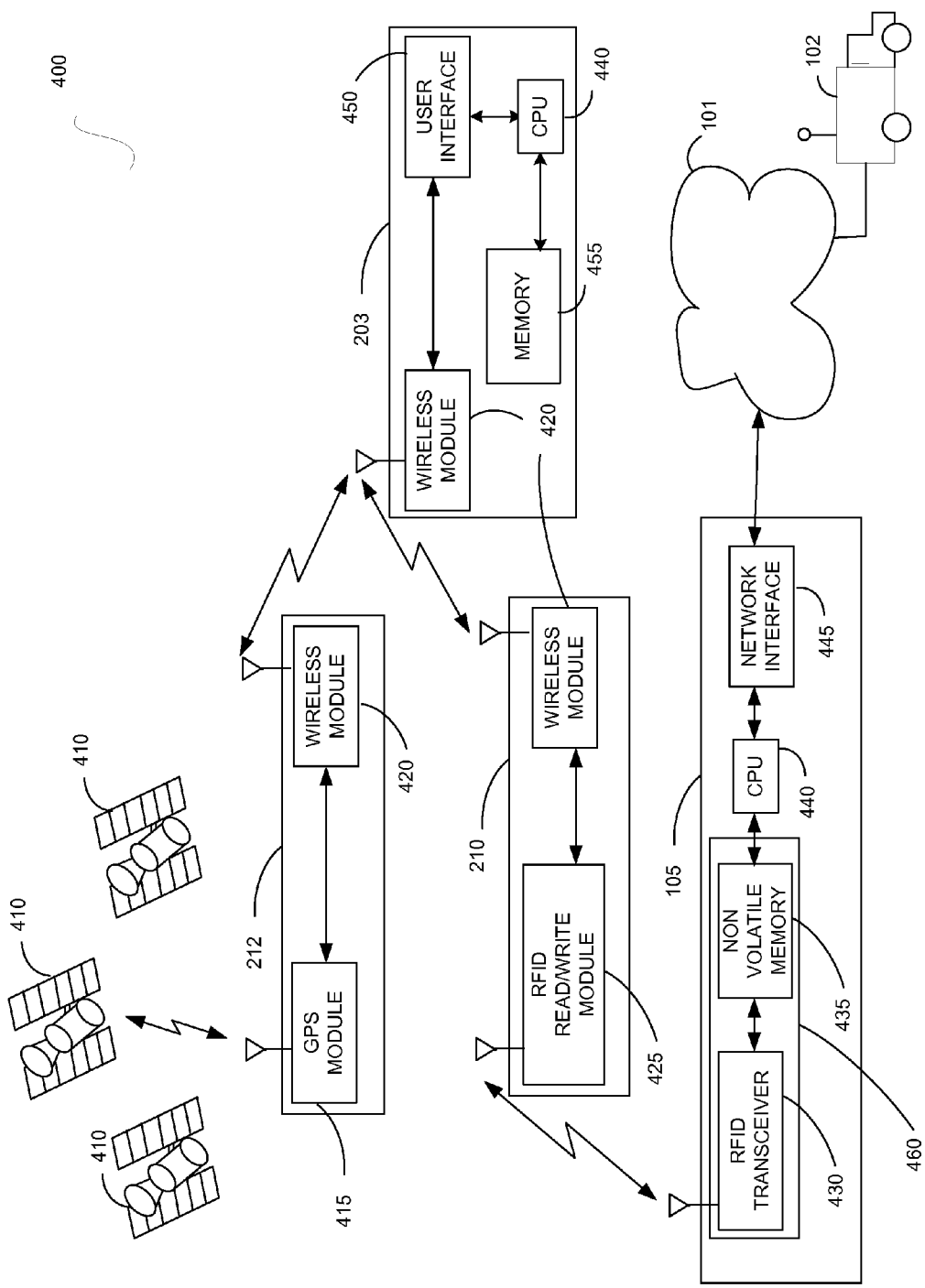
FIG. 4 illustrates a land-based survey data acquisition system in accordance with one or more implementations described herein.

FIG. 3 illustrates a flow chart of a method 300 for configuring land survey sensors 105 in accordance with one or more implementations described herein. The method 300 will be described with reference to FIG. 2 and FIG. 4. FIG. 4 illustrates a land-based survey data acquisition system 400 in accordance with one or more implementations described herein. Further, it should be understood that while the operational flow chart for method 300 indicates a particular order of execution of the operations, in other implementations, the operations might be executed in a different order. The method 300 may be performed by the handheld device 203, the GNSS device 212 and the RFID read-write device 210.

At step 310, the handheld device 203 may receive the one or more planned positions of the sensors 105. As stated previously, the survey team may plan the deployment of the sensors 105 by determining coordinates for each planned position of the sensors 105. These coordinates may be downloaded into the memory 455 of the handheld device 203.

At step 320, the sensors 105 may be placed according to the planned positions. As stated previously, in some circumstances, an obstruction may exist at the planned position. If an obstruction exists at the planned position, the sensor 105 may be placed at a position different from the planned position. For example, the sensor 105 may be placed in a nearby position that is clear of obstructions.

At step 330, the actual position of the sensors 105 may be determined. In one implementation, the GPS module 415 may be used to determine the actual positions of the sensors 105. In such a case, the survey crew may place the tool 215 on top of the placed sensor 105. The GPS module 415 may then communicate with satellites 410 of the GNSS to determine the coordinates of the actual positions based on the position of the tool 215.

At step 340, the actual positions may be sent to the sensors 105. In one implementation, the GNSS device 212 may send the coordinates of the actual positions to the handheld device 203 via the wireless modules 420 of each device. The actual positions may be stored in the memory 455 of the handheld device. In turn, the handheld device 203 may send the actual positions to the RFID read-write device 210 via the wireless modules 420 of each device.

The RFID read-write device 210 may include an RFID read-write module 425. The RFID read-write module 425 may include an RFID write module that is configured to send the actual positions to the sensors 105.

The sensors 105 may include an active RFID tag 460. The active RFID tag 460 may include an RFID transceiver 430 and non-volatile memory 435. The RFID read-write module 425 may send the actual positions to the RFID transceiver 430. The RFID transceiver 430 may store the actual positions in the non-volatile memory 435. Advantageously, because the RFID tag 460 may have its own power source (not shown), the RFID transceiver 430 may receive and store the actual positions while the sensors 105 are powered off.

In one implementation, the handheld device 203 may also include the GPS module 415, an RFID read module, an RFID write module, the RFID read-write module 425, or combinations thereof. In such an implementation, the RFID transceiver 430 may be configured to receive the actual positions from the handheld device 203.

In another implementation, additional information may be sent to the sensors 105 for storage in the non-volatile memory 435. For example, the time of the placement of the sensors 105, the weather conditions, a description of the surface geology, and a description of the coupling of the sensors 105 to the surface may also be sent to the sensors 105. In such an implementation, a user may enter the information into the handheld device 203 via the user interface 450. Consequently, the information may be sent to the RFID read-write device 210, and the sensors 105 as described above.

At step 350, the handheld device 203 may receive serial numbers of the sensors 105. The serial numbers may uniquely identify individual sensors. In one implementation, the serial number for each of the sensors 105 may be contained within the non-volatile memory 435. In such an implementation, the RFID-read-write module 425 may be configured to receive the serial numbers from the sensors 105. In particular, the RFID read-write module 425 may receive the serial numbers from the RFID transceivers 430.

In turn, the RFID read-write device 210 may send the serial numbers to the handheld device 203 via the wireless modules 420 of each device. The handheld device 230 may store the serial numbers in the memory 455. In one implementation, the handheld device 203 may build a table that associates the serial numbers with the actual positions for their corresponding sensors 105.

The table data may then be sent to the data center for later processing. In some implementations, the table data may be sent to a recording truck or camp.

At step 360, the actual positions may be forwarded to the data center. At step 370, the serial numbers may be forwarded to the data center. The forwarded data may be used in the processing of the seismic data as described with reference to FIG. 5.

Figure 5:
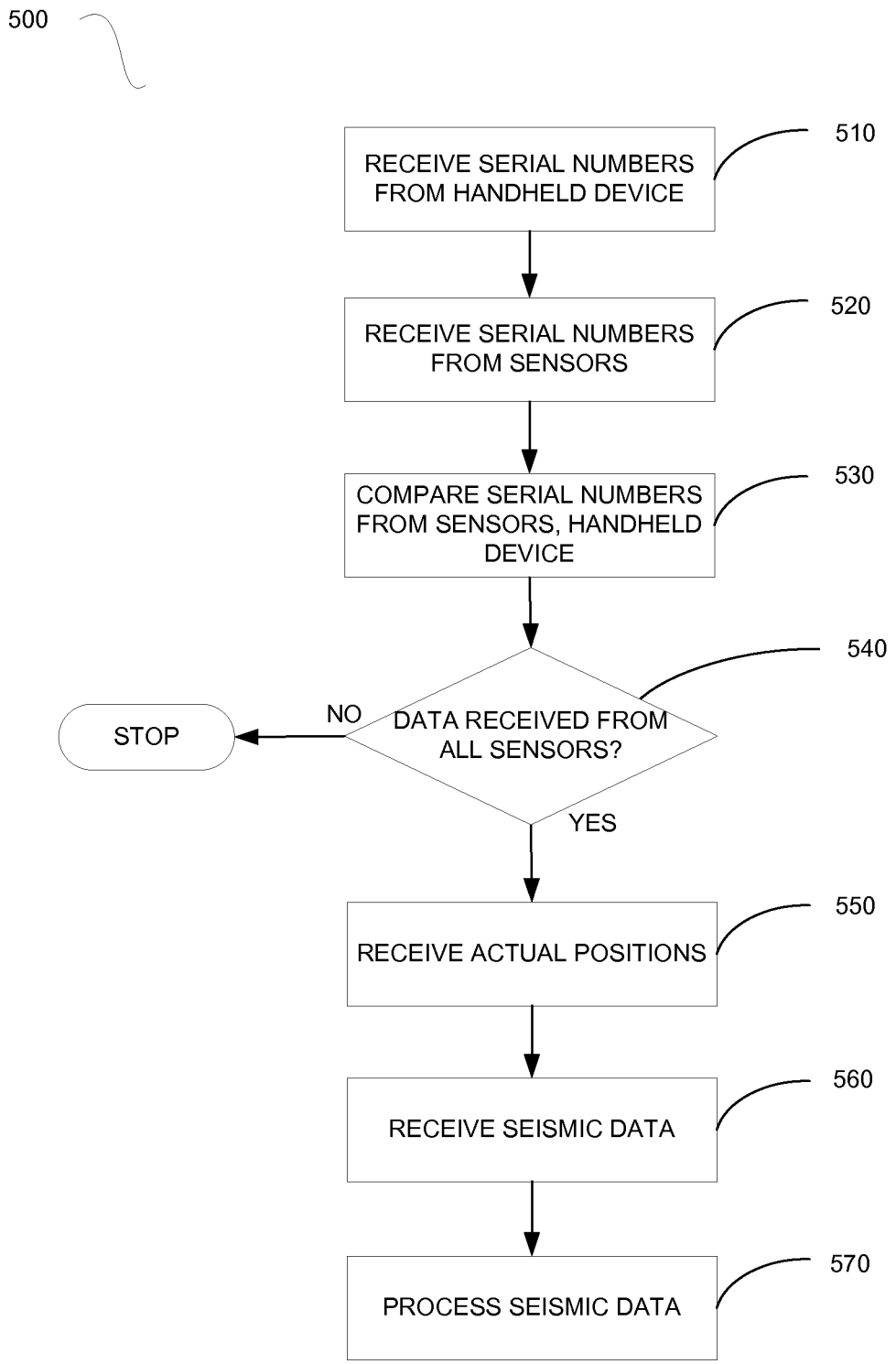
FIG. 5 illustrates a flow chart of a method for processing seismic data in accordance with one or more implementations described herein.

FIG. 5 illustrates a flow chart of a method 500 for processing seismic data in accordance with one or more implementations described herein. The method 500 may be performed at the data center after the seismic survey has been conducted. Further, it should be understood that while the operational flow chart for method 500 indicates a particular order of execution of the operations, in other implementations, the operations might be executed in a different order.

At step 510, the serial numbers may be received from the handheld device 203. At step 520, the serial numbers may be received from the sensors 105. In other words, all the sensors 105 that send seismic data may also send their serial numbers 105. In the event that one of the sensors 105 fails, the serial number of the failed sensor 105 may not be received.

At step 530, the serial numbers from the handheld device 203 and the sensors 105 may be compared. If there are serial numbers received from the handheld device 203 that are not received from the sensors 105, data from the sensors with the missing serial numbers may not have been received.

At step 540, if data is not received from all the sensors 105, the method 500 may terminate. If at step 540, data is received from all the sensors 105, the method 500 continues to step 550.

At step 550, the actual positions of the sensors 105 may be received. At step 560, the seismic data from the sensors 105 may be received.

At step 570, the seismic data may be processed based on the actual positions received from the sensors 105. The appropriate processing of the seismic data may depend on having the coordinates for the actual positions where the sensors 105 are located during the survey. For example, having incorrect data about the actual positions may result in errors being introduced into the generated images of the subsurface.

Figure 6:
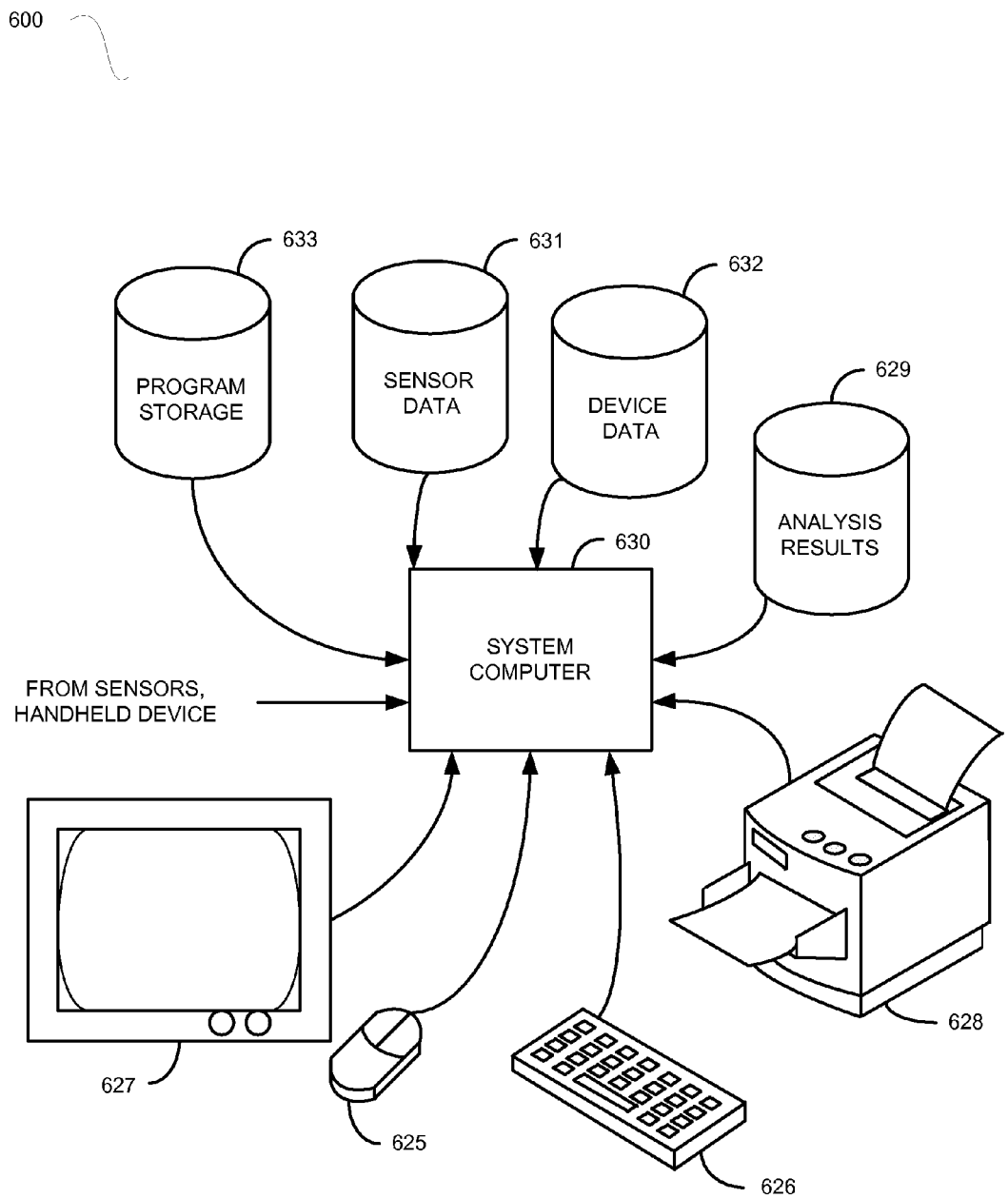
FIG. 6 illustrates a computer network into which implementations of various technologies described herein may be implemented.

FIG. 6 illustrates a computing system 600, into which implementations of various technologies described herein may be implemented. The computing system 600 may include one or more system computers 630, which may be implemented as any conventional personal computer or server. However, those skilled in the art will appreciate that implementations of various technologies described herein may be practiced in other computer system configurations, including hypertext transfer protocol (HTTP) servers, handheld devices, multiprocessor systems, microprocessor-based or programmable consumer electronics, network PCs, minicomputers, mainframe computers, and the like.

The system computer 630 may be in communication with disk storage devices 629, 631, 632, and 633, which may be external hard disk storage devices. It is contemplated that disk storage devices 629, 631, 632, and 633 are conventional hard disk drives, and as such, will be implemented by way of a local area network or by remote access. Of course, while disk storage devices 629, 631, 632, and 633 are illustrated as separate devices, a single disk storage device may be used to store any and all of the program instructions, sensor data, device data, and results as desired.

In one implementation, seismic data collected from the land-based survey data acquisition system 100 may be stored in disk storage device 631. Additionally, data received from the handheld device 203 may be stored in disk storage device 632. The system computer 630 may retrieve the appropriate data from the disk storage devices 631, 632 to process seismic and device data according to program instructions that correspond to implementations of various technologies described herein. The program instructions may be written in a computer programming language, such as C++, Java and the like. The program instructions may be stored in a computer-readable medium, such as program disk storage device 633. Such computer-readable media may include computer storage media and communication media.

Computer storage media may include volatile and nonvolatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 630.

Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

In one implementation, the system computer 630 may present output primarily onto graphics display 627, or alternatively via printer 628. The system computer 630 may store the results of the methods described above on disk storage 629, for later use and further analysis. The keyboard 626 and the pointing device (e.g., a mouse, trackball, or the like) 625 may be provided with the system computer 630 to enable interactive operation.

The system computer 630 may be located at a data center remote from the area of interest. The system computer 630 may be in communication with the sensors 105, and the handheld device 203 (either directly or via a recording unit, not shown), to receive seismic and device data. After conventional formatting and other initial processing, this data may be stored by the system computer 630 as digital data in the disk storage 631, 632 for subsequent retrieval and processing in the manner described above.

While FIG. 6 illustrates the disk storage 631, 632 as directly connected to the system computer 630, it is also contemplated that the disk storage devices 631, 632 may be accessible through a local area network or by remote access. Furthermore, while disk storage devices 629, 631, and 632 are illustrated as separate devices for storing input data and analysis results, the disk storage devices 629, 631, and 632 may be implemented within a single disk drive (either together with or separately from program disk storage device 633), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for configuring land survey sensors, comprising:
   receiving one or more planned positions of the sensors;
   determining one or more actual positions of the sensors;
      sending the actual positions to radio-frequency identification (RFID) transceivers of the sensors receiving one or more serial numbers of the sensors from the RFID transceivers of the sensors forwarding the one or more serial numbers to a data center using the handheld device; and
   forwarding the actual positions to the data center.

2. The method of claim 1, wherein the actual positions of the sensors are determined using a global navigation satellite system.

3. The method of claim 1, further comprising placing the sensors according to the planned positions.

4. The method of claim 3, wherein placing the one or more sensors according to the planned positions comprises placing the one or more sensors in one or more positions different from the planned positions if an obstruction exists at the planned positions.

5. The method of claim 3, wherein the planned positions are different from the actual positions.

6. The method of claim 1, further comprising sending a time of the placement of the sensors, a weather condition at the time, a geology description of a surface at the actual positions, a description of a coupling of the sensors to the surface at the actual positions, or combinations thereof, to the sensors.

7. The method of claim 1, wherein the sensors comprise electromagnetic survey sensors.

8. The method of claim 1, wherein the sensors comprise seismic survey sensors.

9. A land acquisition system, comprising:
   a plurality of sensors disposed in a survey area;
   a handheld device for configuring the sensors comprising:
      a processor; and
      a memory having program instructions configured to cause the processor to:
         receive one or more planned positions of the sensors;
         determine one or more actual positions of the sensors;
         send the actual positions to radio-frequency identification (RFID) transceivers of the sensors while the sensors are powered off;
         receive one or more serial numbers of the sensors from the RFID transceivers of the sensors;
         forward the one or more serial numbers to a data center; and
         send the actual positions to the data center.

10. The land acquisition system of claim 9, wherein the handheld device further comprises a global navigation satellite system (GNSS) module configured to determine the actual positions of the sensors.

11. The land acquisition system of claim 9, wherein the handheld device further comprises a RFID write module configured to send the actual positions to the sensors.

12. The land acquisition system of claim 9, wherein the handheld device further comprises a RFID read module configured to receive the one or more serial numbers of the sensors.

13. The land acquisition system of claim 9, wherein each sensor comprises an active RFID tag that is configured to receive the actual positions from the handheld device and to write the actual positions to a memory of the RFID tag.

14. The land acquisition system of claim 9, wherein the sensors comprise electromagnetic survey sensors.

15. The land acquisition system of claim 9, wherein the sensors comprise seismic survey sensors.

16. A method for processing seismic data, comprising:
   receiving, at a data center, a first set of serial numbers of sensors from a handheld device, wherein the first set of serial numbers was received from radio-frequency identification (RFID) transceivers of the sensors while the sensors were powered off;
   receiving, at the data center, a second set of serial numbers of the sensors from the sensors;
   comparing the first set of serial numbers with the second set of serial numbers;
   determining, using a microprocessor, whether seismic data has been received from the sensors in a seismic survey area based on the comparison;
   receiving actual positions of the sensors; and
   processing the seismic data based on the actual positions if it is determined that the seismic data has been received from the sensors based on the comparison.

17. The method of claim 16, wherein determining whether the seismic data has been received from the sensors comprises:
   determining that the seismic data from all of the sensors have not been received, if the first set of serial numbers does not match the second set of serial numbers.

18. The method of claim 16, wherein determining whether the seismic data has been received from the sensors comprises:
   determining that the seismic data from all of the sensors have been received, if the first set of serial numbers matches the second set of serial numbers.

19. The method of claim 16, wherein the first set of serial numbers was received by the handheld device from the RFID transceivers of the sensors.

\* \* \* \* \*